United States Patent
Bernreitner et al.

(10) Patent No.: US 10,919,993 B2
(45) Date of Patent: *Feb. 16, 2021

(54) INJECTION MOLDED ARTICLE BASED ON PROPYLENE HOMOPOLYMER

(71) Applicant: BOREALIS AG, Vienna (AT)

(72) Inventors: Klaus Bernreitner, Linz (AT); Martina Sandholzer, Linz (AT); James Stern, Vienna (AT); Joanne Belshaw, Wellingborough (GB)

(73) Assignee: BOREALIS AG, Vienna (AT)

( * ) Notice: Subject to any disclaimer, the term of this patent is extended or adjusted under 35 U.S.C. 154(b) by 91 days.

This patent is subject to a terminal disclaimer.

(21) Appl. No.: 16/090,543

(22) PCT Filed: Apr. 13, 2016

(86) PCT No.: PCT/EP2016/058139
§ 371 (c)(1),
(2) Date: Oct. 1, 2018

(87) PCT Pub. No.: WO2017/178046
PCT Pub. Date: Oct. 19, 2017

(65) Prior Publication Data
US 2019/0112401 A1  Apr. 18, 2019

(51) Int. Cl.
C08F 110/06 (2006.01)
C08L 23/12 (2006.01)
B29C 45/00 (2006.01)
B29K 23/00 (2006.01)

(52) U.S. Cl.
CPC ........ *C08F 110/06* (2013.01); *B29C 45/0001* (2013.01); *C08L 23/12* (2013.01); *B29K 2023/12* (2013.01)

(58) Field of Classification Search
CPC .... C08F 110/06; B29C 45/0001; C08L 23/12; B29K 2023/12
USPC ...................................................... 526/122
See application file for complete search history.

(56) References Cited

U.S. PATENT DOCUMENTS

| | | | |
|---|---|---|---|
| 6,900,281 B2 | 5/2005 | Streeky et al. | |
| 8,263,692 B2 | 9/2012 | Sheard et al. | |
| 10,138,335 B2 * | 11/2018 | Bernreitner | B29C 45/0001 |
| 2014/0121339 A1 * | 5/2014 | Wang | C08F 110/06 |
| | | | 526/125.3 |

FOREIGN PATENT DOCUMENTS

| | | |
|---|---|---|
| CN | 107075207 A | 8/2017 |
| DE | 102013221844 A1 | 4/2014 |
| EP | 0491566 A2 | 9/1992 |
| EP | 0586390 B1 | 3/1994 |
| EP | 0591224 B1 | 4/1994 |
| EP | 0887379 A1 | 12/1998 |
| EP | 0887380 A1 | 12/1998 |
| EP | 0887381 A1 | 12/1998 |
| EP | 0991684 B1 | 4/2000 |
| EP | 1028984 B1 | 8/2000 |
| EP | 1183307 B1 | 3/2002 |
| EP | 2514770 A1 | 10/2012 |
| EP | 2610270 A1 | 7/2013 |
| EP | 2610271 A1 | 7/2013 |
| EP | 2610272 A1 | 7/2013 |
| EP | 3184449 A1 | 6/2017 |
| WO | 92/12182 A1 | 7/1992 |
| WO | 98/58975 A1 | 12/1998 |
| WO | 98/58976 A1 | 12/1998 |
| WO | 98/58977 A1 | 12/1998 |
| WO | 99/25741 A1 | 5/1999 |
| WO | 00/68315 A1 | 11/2000 |
| WO | 2004/111095 A1 | 12/2004 |
| WO | 2012/007430 A1 | 1/2012 |
| WO | 2015075054 A1 | 5/2015 |
| WO | 2015075088 A1 | 5/2015 |
| WO | 2015091839 A1 | 6/2015 |
| WO | 2016079111 A1 | 5/2016 |

OTHER PUBLICATIONS

Parkinson, et al., "Effect of Branch Length on 13C NMR Relaxation Properties in Molten Poly[ethylene-co-(a-olefin)] Model Systems", 2007, pp. 21828-2133.
Klimke, et al., "Optimisation and Application of Polyolefin Branch Quantification by Melt-State 13C NMR Spectroscopy", Macromol. Chem. Phys. 2006, pp. 382-395.
Zhou, et al., "A new decoupling method for accurate quantification of polyethylene copolymer composition and triad sequence distribution with 13C NMR", Journal of Magnetic Resonance 187, (2007), pp. 225-233.
Resconi, et al., "Selectivity in Propene Polymerization with Metallocene Catalysts", Chem. Rev. 2000, pp. 1253-1345.
Pollard, et al., "Observation of Chain Branching in Polyethylene in the Solid State and Melt via 13C NMR Spectroscopy and Melt NMR Relaxation Time Measurements", Macromolecules 2004, pp. 813-825.
Griffin, et al., "Low-load rotor-synchronised Hahn-echo pulse train (RS-HEPT) 1H decoupling in solid-state NMR: factors affecting MAS spin-echo dephasing times", Oct. 16, 2007, pp. S198-S208.
Filip, et al., "Heteronuclear decoupling under fast MAS by a rotor-synchronized Hahn-echo pulse train", Journal of Magnetic Resonance, (2005), pp. 239-243.
Busico, et al., "Full Assignment of the 13C NMR Spectra of Regioregular Polypropylenes: Methyl and Methylene Region", Macromolecules 1997, pp. 6251-6263.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.
Busico, et al., "Microstructure of polypropylene", Prog. Polym. Sci. 26, (2001), pp. 443-533.

(Continued)

*Primary Examiner* — William K Cheung
(74) *Attorney, Agent, or Firm* — Tarolli, Sundheim, Covell & Tummino LLP

(57) ABSTRACT

Injection molded article for healthcare applications based on propylene homopolymer.

17 Claims, No Drawings

(56) References Cited

OTHER PUBLICATIONS

Gastignolles, et al. "Detection and quantification of branching in polyacrylates by size-exclusion chromatography (SEC) and melt-state 13C NMR spectroscopy", (2009), pp. 2373-2383.
H.N.Cheng, "13C NMR Analysis of Ethylene-Propylene Rubbers", Macromolecules 1984, 17, 1950-1955.
Wang et al., "Structural Analysis of Ethylene/Propylene Copolymers Synthesized with a Constrained Geometry Catalyst", Macromolecules 2000, 33, pp. 1157-1162.
Zweifel, et al., "Plastics Additives Handbook", 5th Edition, Department of Materials, Institute of Polymers, 2001.
Kissinger, "Variation of Peak Temperature With Heating Rate in Differential Thermal Analysis", Journal o f Research of the National Bureau of Standards, vol. 57, No. 4, Oct. 1956, pp. 217-221.
Pasquini, Polypropylene Handbook, 2nd edition, p. 18, 2005.
Chinese Office Action for Application No. 201680083821.3 dated Jun. 22, 2020.
Opposition as Filed against EP 3 443 016 dated Jul. 30, 2020.
ASTM D1003-92, Janvier 1992, "Standard Test Method for Haze and Luminous Transmittance of Transparent Plastics".
ASTM D5492-10, "Standard Test Method for Determination of Xylene Solubles in Propylene Plasics".
ISO 11357-3 Second Edition May 1, 2011 "Plastics—Differential scanning calorimetry (DSC)—Part 3: Determination of temperature and enthalpy of melting and crystallization".
Charles A. Harper (Editor in Chief)—Extract of Modern Plastics Handbook, 2000, ISBN 0-07-026714-6.
Datasheet Purell HP570U dated 2013.
Ismael Amer er al_ in Molecular weight and tacticity effect on morphological and mechanical properties of Ziegler-Natta catalyzed isotactic polypropylenes.
Wei Tracy Huang, "Extract of Melting Kinetics of Ziegler-Natta and Metallocene Isotactic Polypropylenes" 2005.
Tranchida D, et al. "Influence of 2,1-erythro regiodefects on the crystallization behavior of isotactic polypropylene" Jun. 2, 2018.
Datasheet of a metallocene-catalyzed polypropylene.
ISO 16152 Juillet, 2005.
Dr. Nello Pasquini (Editor) Extract of Propylene handbook, 2005, ISBN, 1-56990-385-9.
B.C. Repka, Hercules Polypropylene, Kirk-Othmer Encyclopedia of Chemical Technology, vol. 14, Second Edition, pp. 282-309, 1967.
J. C. Chadwick et al., "Propene polymerization with MgCl2-supported catalysts: effects of using a diether as external doner" Macromol. Chem. Phys. 1997, 198, 1181-1188.
J. Karger-Kocsis et al., Polypropylene Handbook—Morphology, Blends and Composites, Springer (2018).

J.C. Chadwick et al., "Hydrogen activation in propene polymerization with MgCl2-supported Ziegler-Nattaq catalysts: the effect of the external donor" Macromol. Chem. Phys. 1994, 195, 167-172.
J.C. Chadwick et al., "Regio- and sterospecificity in propene polymerization with MgCl2-supported Ziegler-Natta catalysts: effects of hydrogen and the external donor" Macromol. Chem. Phys. 1995, 196, 1431-1437.
N. Pasquini, Polypropylene—Handbook, 2nd ed. 2005, Carl Hanser, pp. 34-49.
R. Paukkeri, "Microstructural analysis of polypropylenes produced with hetergeneous Ziegler-Natta catalysts" Polymer, 1993, 34(12), 2488-2494.
C. Maier et al., Polypropylene—the definitive User's Guide and Databook, 1998, Plastics Design Library.
D.B. Malpass et al., "Introduction to Industrial Polypropylene, Properties, Catalysts, Processes", 2012, Wiley, pp. 33-36.
E.P. Moore, "Polypropylene Handbook: Polymerization, Characterization, Properties, Processing, Applications", 1996, hanser, pp. 240-243.
Lyondelbasell, Purell—Excellence builds trust, Take a closer look, 2011, LB 11 043 e.
Extract from Internet Archive WaybackMachine of Nov. 21, 2015, "Polipropylen Purell".
Kunstoffe.de, Purell—Langfristig konstant und sicher, Apr. 17, 2014.
Borealis, Solutions for molding applications, 2005 Borealis A_S.
Lyondellbasell, Purell—resins, safety, consistency, reliability, LB09_023 e 0203.
Polipropylen Purell, Przewodnik Po Produktach.
H. G. Karian, Handbook of Polproplylene and Polypropylene Composites, 2009, Macel Dekker, Inc. New York, Basel.
Market analysis regarding polypropylene products.
V. Busico et. al., "Full Assignment of the 13C NMR Spectra of Regioregular Polypropylenes: Methyl and Methylene Region" Macromolecules 1997, 30 6251-6263.
European Opposition as filed by Ineos for Application No. 16717882.1-1102/3443016 dated Aug. 17, 2020.
European Opposition as filed by Grace for Application No. 16717882.1-1102/3443016 dated Aug. 17, 2020.
Y.E. Shapiro, Bulletin of Magnetic Resonance, 1985, vol. 7, No. 1, pp. 27-58.
S. van der Ven, Polypropylene and Other Polyolefins, 1990, Elsevier, pp. 564-569.
S.-N. Zhu et al., "13C NMR Chemicals Shifts in Polypropylene and the Bi-Catalytic Propagation Mechanism in Polymerization" Polymer Journal, vol. 15, No. 12, pp. 859-868,1983.
V-Shah, Handbook of Plastics Testing Technology, 1984, Wiley Interscience, pp. 166-169.

\* cited by examiner

INJECTION MOLDED ARTICLE BASED ON PROPYLENE HOMOPOLYMER

The present application is a 35 U.S.C. 371 national stage application of PCT International Application No. PCT/EP2016/058139, filed on Apr. 13, 2016.

The present intention is directed to a new injection molded article based on a propylene homopolymer with high meso sequence length.

Polypropylene is used in many applications. Depending on its end applications the properties of the polypropylene must be tailored accordingly. For instance some end applications require rather stiff material. In the healthcare segment is a strong trend to high flow grades to reach high cavity numbers and faster cycle times. The problem with such grades is that in injection moulding of small items, like pipette tips, rapid crystallization occurs leading thereby to bubble formation and warpage of the final part.

Accordingly the object of the present invention provide a polymer which enables the skilled artisan to produce stiff injection moulded articles in short cycle times, wherein the final parts do not suffer from bubble formation and/or cycle time. A strong indicator that bubble formation and warpage do not occur is a high quenching resistance.

The finding of the present invention is that a propylene homopolymer must be used having a rather high flow rate and high pentade concentration paired with a high meso sequence length.

Accordingly the present invention is directed to an injection molded article comprising a propylene homopolymer having (a) a melt flow rate $MFR_2$ (230° C./2.16 kg) measured according to ISO 1133 in the range of 40 to 120 g/10 min;
(b) a pentad isotacticity (mmmm) of more than 92.5% determined by $^{13}$C-NMR; and
(c1) a meso sequence length (MSL4) of equal or more than 90.0, preferably in the range of equal or more than 94.0 to 160; MSL4 is calculated by formula (1)

$$MSL4 = \frac{2*[mmmm]}{[mmmr]} + 4 \quad (1)$$

wherein
"[mmmm]" is % of mmmm pentads,
"[mmmr]" is % of mmmr pentads,
determined by $^{13}$C-NMR spectroscopy
and/or
(c2) a meso sequence length (MSL2) of equal or more than 65.0; MSL2 is calculated by formula (2)

$$MSL2 = \frac{2*[mm]}{[mr]} + 2 \quad (2)$$

wherein
"[mm]" is % of mm triads,
"[mr]" is % of mr triads,
determined by $^{13}$C-NMR spectroscopy.

In one variant the present invention is directed to an injection molded article comprising a propylene homopolymer having (a) a melt flow rate $MFR_2$ (230° C./2.16 kg) measured according to ISO 1133 in the range of 40 to 120 g/10 min;
(b) a pentad isotacticity (mmmm) of more than 92.5% determined by $^{13}$C-NMR;
(c) a meso sequence length (MSL4) of equal or more than 90.0; MSL4 is calculated by formula (1)

$$MSL4 = \frac{2*[mmmm]}{[mmmr]} + 4 \quad (1)$$

wherein
"[mmmm]" is % of mmmm pentads
"[mmmr]" is % of mmmr pentads,
determined by $^{13}$C-NMR spectroscopy; and
(d) a molecular weight distribution (MWD) of 7.5 or less.

Preferably the injection molded article according to this invention comprises at least 75 wt.-%, based on the total weight of the injection molded article, of the propylene homopolymer.

Preferably, the injection molded article according to the present invention is for healthcare applications.

In a preferred embodiment the injection molded article according to this invention is selected from the group consisting of syringes, pipette tips, and PCR equipment.

Preferably the injection molded article according to this invention is of small size, i.e. has in its largest dimension a length of not more than 150 mm, like not more than 130 mm.

Preferably the propylene homopolymer used in the injection molded article has 2,1 erythro regio-defects of equal or below 0.4% determined by $^{13}$C-NMR spectroscopy.

Still more preferably the propylene homopolymer used in the injection molded article has (a) a triad syndiotacticity (rr) of not more than 2.5% as determined by $^{13}$C-NMR spectroscopy;
and/or
(b) a pentad isotacticity (mmmm) in the range of 93.0 to 96.5% as determined by $^{13}$C-NMR spectroscopy.

In still a further preferred embodiment the propylene homopolymer used in the injection molded article has a xylene cold soluble content (XCS) determined according ISO 16152 (25° C.) of below 4.0 wt.-%.

In yet another preferred embodiment the propylene homopolymer used in the injection molded article has (a) a melting temperature of at least 158° C.;
and/or
(b) a crystallization temperature of equal or below 122° C.

In a particular preferred embodiment the propylene homopolymer used in the injection molded article is not-visbroken.

Further it is preferred that the propylene homopolymer used in the injection molded article has (a) a flexural modulus measured at 23° C. according to ISO 178 of at least 1,350 MPa;
and/or
(b) a clarity measured according to ASTM D 1003/92 on injection molded specimens of 1 mm thickness of at least 55%.

The present invention is additionally directed to the use of the propylene homopolymer as defined in the present invention in an injection molded article, especially in an article as defined in the present invention.

The invention is also directed to the process for producing an injection molded article according to this invention, wherein the propylene homopolymer as defined herein is injection molded, wherein further said propylene homopolymer has been obtained by polymerizing propylene in the presence of (a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;
(b) optionally a co-catalyst (Co), and
(c) optionally an external donor (ED).

Preferably
(a) the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate;
and/or
(b) the molar-ratio of co-catalyst (Co) to external donor (ED) [Co/ED] is 5 to 45.

The present invention will be now described in more detail.

The present invention is directed to an injection molded article comprising a specific homopolymer as defined above and in more detail below. The molded article can be any molded article. The term injection molded article is understood as known in the art. Reference is made inter alia to "Propylene Handbook", Nello Pasquini, $2^{nd}$ edition (2005), pages 422 to 443.

Preferably the injection molded article according to this invention is any of for healthcare applications.

Still more preferably the injection molded article is of small size; especially the injection molded article is of small size and for healthcare applications. An injection molded article of small size is an article having in its largest dimension a length of not more 150 mm, like not more than 130 mm, preferably a length in the range of 0.5 to 2.0 mm, still more preferably in the range of 0.1 to 1.5 mm.

Thus it is especially preferred that the injection molded article according to this invention is selected from the group consisting of syringes, pipette tips, PCR equipment like titer plates, microtiter plates and vials.

Syringes are especially barrels and plungers of standard or micro-syringes. Preferred PCR equipments are selected from the group consisting of titer plates, microtiter plates and vials.

Thus it is especially preferred that the injection molded article according to this invention is selected from the group consisting of syringes, like barrels and plungers of standard or micro-syringes, pipette tips, PCR equipment, like titer plates, microtiter plates and vials, and having in its largest dimension a length of not more 150 mm, like not more than 130 mm, preferably a length in the range of 0.5 to 2.0 mm, still more preferably in the range of 0.1 to 1.5 mm.

Preferably the injection molded article according to this invention comprises at least 75 wt.-%, more preferably of at least 80 wt.-%, still more preferably in the range of 75 to 99.9 wt.-%, yet more preferably in the range of 80 to 99.9 wt.-%, still yet more preferably in the range of 90 to 99.9 wt.-%, like in the range of 95 to 99.9 wt.-%, based on the total weight of the injection molded article.

In one preferred embodiment the injection molded article does not comprise an elastomeric polymer in an amount exceeding 10 wt.-%, more preferably does not exceed 5 wt.-%, based on the total weight of the injection molded article. An elastomeric polymer according to this invention is a polymer which is not miscible with the propylene homopolymer as defined herein and thus forms a separate phase. Still more preferably the injection molded article according to this invention does not comprise (a) further polymer(s) different to the propylene homopolymer according to this invention in an amount exceeding in total 10 wt.-%, preferably exceeding in total 5 wt.-%, based on the total weight of the injection molded article. Typically if an additional polymer is present, such a polymer is a carrier polymer for additives and thus does not contribute to the improved properties of the claimed injection molded article.

Accordingly in one specific embodiment the injection molded article consists of the propylene homopolymer as defined herein and additional additives, which might contain in low amounts of polymeric carrier material. However this polymeric carrier material is not more than 10 wt.-%, preferably not more than 5 wt.-%, based on the total weight of the injection molded article, present in said injection molded article.

In the following the propylene homopolymer according to this invention is defined in more detail.

According to the present invention the expression "propylene homopolymer" relates to a polypropylene that consists substantially, i.e. of at least 99.0 wt.-%, more preferably of at least 99.5 wt.-%, still more preferably of at least 99.8 wt.-%, like of at least 99.9 wt.-%, of propylene units. In another embodiment only propylene units are detectable, i.e. only propylene has been polymerized.

One requirement of the propylene homopolymer according to this invention is its melt flow rate. Accordingly the propylene homopolymer has an $MFR_2$ (230° C./2.16 kg) measured according to ISO 1133 in the range of 40 to 120 g/10 min, preferably in the range of 50 to below 100 g/10 min, more preferably in the range of 55 to 90 g/10 min, even more preferably in the range of 60 to 85 g/10 min.

The propylene homopolymer according to this invention is isotactic. Accordingly it is preferred that the propylene homopolymer has a rather high pentad concentration (mmmm %) as determined by $^{13}$C-NMR spectroscopy, i.e. more than 92.5%, still more preferably in the range of 92.5 to 97.3%, yet more preferably in the range of 93.0 to 97.0%, like in the range of 93.1 to 96.5%.

In a preferred embodiment the propylene homopolymer has a triad syndiotacticity (rr %) as determined by $^{13}$C-NMR spectroscopy of not more than 2.5%, more preferably in the range of 0.8 to 2.2%, still more preferably in the range of 1.0 to 2.1%, yet more preferably in the range of 1.5 to 2.1%.

Another requirement is that the propylene homopolymer according to this invention has a specific meso sequence length (MSL). The MSL is a measure of the average number of monomer units per crystallisable sequences. On the other hand the average length of the crystallisable sequences determines the lamella thickness and thus the melting behavior and crystallization speed of the propylene homopolymer. Accordingly it is required that the propylene homopolymer has
(a) a meso sequence length (MSL4) of equal or more than 90.0, more preferably in the range of 91.0 to 160, like in the range of 91.0 to 120, yet more preferably in the range of 91.0 to 150, like in the range of 91.0 to 110, still more preferably in the range of 91.5 to 130, like in the range of 91.5 to 100;
and/or
(b) a meso sequence length (MSL2) of equal or more than 65.0, more preferably in the range of 66.0 to 200, yet more preferably in the range of 70.0 to 180, still more preferably in the range of 70.0 to 150.

The meso sequence length (MSL4) is calculated by formula (1)

$$MSL4 = \frac{2 * [mmmm]}{[mmmr]} + 4 \qquad (1)$$

wherein
"[mmm]" are % of mmmm pentads,
"[mmr]" are % of mmmr pentads,
determined by $^{13}$C-NMR spectroscopy.

The meso sequence length (MSL2) is calculated by formula (2)

$$MSL2 = \frac{2 * [mm]}{[mr]} + 2 \qquad (2)$$

wherein
"[mm]" are % of mm triads,
"[mr]" are % of mr triads,
determined by $^{13}$C-NMR spectroscopy.

A further characteristic of the propylene homopolymer is the low amount of misinsertions of propylene within the polymer chain, which indicates that the propylene homopolymer is produced in the presence of a Ziegler-Natta catalyst, preferably in the presence of a Ziegler-Natta catalyst (ZN-C) as defined in more detail below. Accordingly the propylene homopolymer is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

It is preferred that the propylene homopolymer according to this invention has a xylene cold soluble (XCS) of below 4.0 wt.-%. Accordingly, the propylene homopolymer has preferably a xylene cold soluble content (XCS) in the range of 2.0 to 4.0 wt.-%, more preferably in the range of 2.0 to 3.8 wt.-%, still more preferably in the range of 2.8 to 3.6 wt.-%.

It is further preferred that the propylene homopolymer of the present invention has a molecular weight distribution (MWD) of 7.5 or less, more preferably 7.0 or less and particularly preferred 6.2 or less. Usually the propylene homopolymer of the present invention has a molecular weight distribution (MWD) of 3.0 or more, preferably 3.5 or more.

The weight average molecular weight ($M_w$) of the propylene homopolymer is preferably within the range of 100 to 300 kg/mol, more preferably 120 to 200 kg/mol.

The method for the determination of the MWD and the weight average molecular weight ($M_w$) are described in the experimental part.

In one embodiment the present invention is directed to an injection molded article comprising a propylene homopolymer having
(a) a melt flow rate $MFR_2$ (230° C./2.16 kg) measured according to ISO 1133 in the range of 40 to 120 g/10 min;
(b) a pentad isotacticity (mmmm) of more than 92.5% determined by $^{13}$C-NMR;
(c) a meso sequence length (MSL4) of equal or more than 90.0; MSL4 is calculated by formula (1)

$$MSL4 = \frac{2 * [mmmm]}{[mmmr]} + 4 \qquad (1)$$

wherein
"[mmmm]" is % of mmmm pentads
"[mmmr]" is % of mmmr pentads,
determined by $^{13}$C-NMR spectroscopy; and
(d) a molecular weight distribution (MWD) of 7.5 or less.

In one variant the propylene homopolymer has
(a) a molecular weight distribution (MWD) of 7.5 or less, more preferably 7.0 or less and particularly preferred 6.2 or less;
and
(b) a meso sequence length (MSL4) of equal or more than 90.0, more preferably in the range of 91.0 to 160, like in the range of 91.0 to 120, yet more preferably in the range of 91.0 to 150, like in the range of 91.0 to 110, still more preferably in the range of 91.5 to 130, like in the range of 91.5 to 100;
and/or
(c) a meso sequence length (MSL2) of equal or more than 65.0, more preferably in the range of 66.0 to 200, yet more preferably in the range of 70.0 to 180, still more preferably in the range of 70.0 to 150.

The meso sequence length (MSL4) is calculated by formula (1)

$$MSL4 = \frac{2 * [mmmm]}{[mmmr]} + 4 \qquad (1)$$

wherein
"[mmm]" are % of mmmm pentads,
"[mmr]" are % of mmmr pentads,
determined by $^{13}$C-NMR spectroscopy.

The meso sequence length (MSL2) is calculated by formula (2)

$$MSL2 = \frac{2 * [mm]}{[mr]} + 2 \qquad (2)$$

wherein
"[mm]" are % of mm triads,
"[mr]" are % of mr triads,
determined by $^{13}$C-NMR spectroscopy.

The amount of xylene cold solubles (XCS) additionally indicates that the propylene homopolymer is preferably free of any elastomeric polymer component, like an ethylene propylene rubber. In other words, the propylene homopolymer shall be not a heterophasic polypropylene, i.e. a system consisting of a polypropylene matrix in which an elastomeric phase is dispersed. Such systems are featured by a rather high xylene cold soluble content. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene homopolymer according to this invention has no glass transition temperature below −30, preferably below −25° C., more preferably below −20° C.

On the other hand, in one preferred embodiment the propylene homopolymer according to this invention has a glass transition temperature in the range of −12 to 5° C., more preferably in the range of −10 to 4° C.

Further, the propylene homopolymer is preferably a crystalline. The term "crystalline" indicates that the propylene homopolymer has a rather high melting temperature.

Accordingly throughout the invention the propylene homopolymer is regarded as crystalline unless otherwise indicated. Therefore the propylene homopolymer preferably has a melting temperature measured by differential scanning calorimetry (DSC) of equal or more than 158° C., i.e. of equal or more than 158 to 165° C., more preferably of at least 160° C., i.e. in the range of 160 to 164° C.

Further it is preferred that the propylene homopolymer has a crystallization temperature measured by differential scanning calorimetry (DSC) of equal or below 122° C., more preferably in the range of 110 to 122° C., yet more preferably in the range of 112 to 120° C.

Preferably the propylene homopolymer according to this invention is not alpha nucleated; still more preferably is not nucleated at all.

Further it is preferred that the propylene homopolymer according to this invention is not visbroken, for instance by using peroxide compounds.

The propylene homopolymer is further featured by high stiffness. Accordingly the instant propylene homopolymer has a rather high flexural modulus. Accordingly it is preferred that propylene homopolymer has a flexural modulus measured at 23° C. according to ISO 178 of at least 1,350 MPa, more preferably in the range of 1,360 to 2,000 MPa, still more preferably in the range of 1,400 to 1,800 MPa.

The propylene homopolymer according to this invention (as described above) can comprises, more preferably can consist of, two fractions, namely a first propylene homopolymer fraction (H-PP1) and a second propylene homopolymer fraction (H-PP2). Preferably the weight ratio between the first propylene homopolymer fraction (H-PP1) and the second propylene homopolymer fraction (H-PP2) [(H-PP1):(H-PP2)] is 70:30 to 40:60, more preferably 65:35 to 45:55.

The first propylene homopolymer fraction (H-PP1) and the second propylene homopolymer fraction (H-PP2) may differ in the melt flow rate. However it is preferred that the melt flow rate MFR$_2$ (230° C.) of the first propylene homopolymer fraction (H-PP1) and of the second propylene homopolymer fraction (H-PP2) are nearby identical, i.e. differ not more than 15% as calculated from the lower of the two values, preferably differ not more than 10%, like differ not more than 7%.

In another embodiment the propylene homopolymer according to this invention consists of one fraction only.

The propylene homopolymer as defined in the instant invention may contain up to 5.0 wt.-% additives (except the triazine derivatives as mentioned above), like antioxidants, slip agents and antiblocking agents. Preferably the additive content is below 3.0 wt.-%, like below 1.0 wt.-%.

In case the propylene homopolymer comprises a α-nucleating agent (which is less preferred), it is preferred that it is free of β-nucleating agents. The α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and C$_1$-C$_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", pages 871 to 873, 5th edition, 2001 of Hans Zweifel.

Preferably the propylene homopolymer contains up to 3 wt.-% of the α-nucleating agent. In a preferred embodiment, the propylene homopolymer contains not more than 2000 ppm, more preferably of 5 to 2000 ppm, more preferably of 50 to 1500 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4, 6,-di-tert-butylphenyl) phosphate, vinylcycloalkane polymer, vinylalkane polymer, and mixtures thereof.

In one especially preferred embodiment the propylene homopolymer and thus the injection molded article does not contain a α-nucleating agent.

In one variant the present invention is furthermore directed to an injection molded article, wherein the propylene homopolymer has the following properties:

| | | |
|---|---|---|
| Melt flow rate (MFR), determined at 230° C. and under a load of 2.16 kg according to ISO 1133 | [g/10 min] | 76 |
| melting temperature (T$_m$) | [° C.] | 161 |
| crystallization temperature (T$_c$) | [° C.] | 115 |
| glass transition temperature (Tg) | [° C.] | 2.0 |
| Xylene cold solubles (XCS) | [wt.-%] | 3.3 |
| mmmm pentad fraction (mmmm) | [%] | 93.2 |
| triad syndiotacticity rr (rr) | [%] | 2.0 |
| meso sequence length MSL2 | [—] | 76 |
| meso sequence length MSL4 | [—] | 92 |
| Flexural Modulus | [MPa] | 1472 |
| Shrinkage in flow (SH in flow) | [%] | 1.1 |
| Shrinkage across flow (SH across flow) | [%] | 1.3 |
| REact | | 3835 |
| Clarity (0.1 mm) | [%] | 61 | determined as described herein.

In another variant the present invention is furthermore directed to an injection molded article, wherein the propylene homopolymer has the following properties:

| | | |
|---|---|---|
| Melt flow rate (MFR), determined at 230° C. and under a load of 2.16 kg according to ISO 1133 | [g/10 min] | 76 |
| melting temperature (T$_m$) | [° C.] | 161 |
| crystallization temperature (T$_c$) | [° C.] | 115 |
| glass transition temperature (Tg) | [° C.] | 2.0 |
| Xylene cold solubles (XCS) | [wt.-%] | 3.3 |
| mmmm pentad fraction (mmmm) | [%] | 93.2 |
| triad syndiotacticity rr (rr) | [%] | 2.0 |
| meso sequence length MSL2 | [—] | 76 |
| meso sequence length MSL4 | [—] | 92 |
| Flexural Modulus | [MPa] | 1472 |
| Shrinkage in flow (SH in flow) | [%] | 1.1 |
| Shrinkage across flow (SH across flow) | [%] | 1.3 |
| REact | | 3835 |
| Clarity (0.1 mm) | [%] | 61 |
| M$_w$ | [kg/mol] | 140 |
| MWD | | 6.2 | determined as described herein.

The injection molded article according to the present invention, wherein the propylene homopolymer is preferably not having a melt flow rate (MFR), determined at 230° C. and under a load of 2.16 kg according to ISO 1133 of 76 g/10 min, more preferably not having a melt flow rate (MFR), determined at 230° C. and under a load of 2.16 kg according to ISO 1133 of 74 to 78 g/10 min.

The injection molded article according to the present invention, wherein the propylene homopolymer is preferably not having a xylene cold solubles content (XCS) determined according ISO 16152 (25° C.) of 3.3 wt. %, more preferably not having a xylene cold solubles content (XCS) determined according ISO 16152 (25° C.) of 3.2 to 3.4 wt. %.

The injection molded article according to the present invention, wherein the propylene homopolymer is preferably not having a flexural modulus measured at 23° C. according to ISO 178 of 1,472 MPa, more preferably not having a flexural modulus measured at 23° C. according to ISO 178 of 1,442 to 1,502 MPa.

In yet another variant the present invention is furthermore directed to an injection molded article, wherein the propylene homopolymer is not having the following properties:

| | | |
|---|---|---|
| Melt flow rate (MFR), determined at 230° C. and under a load of 2.16 kg according to ISO 1133 | [g/10 min] | 76 |
| melting temperature ($T_m$) | [° C.] | 161 |
| crystallization temperature ($T_c$) | [° C.] | 115 |
| glass transition temperature (Tg) | [° C.] | 2.0 |
| Xylene cold solubles (XCS) | [wt.-%] | 3.3 |
| mmmm pentad fraction (mmmm) | [%] | 93.2 |
| triad syndiotacticity rr (rr) | [%] | 2.0 |
| meso sequence length MSL2 | [—] | 76 |
| meso sequence length MSL4 | [—] | 92 |
| Flexural Modulus | [MPa] | 1472 |
| Shrinkage in flow (SH in flow) | [%] | 1.1 |
| Shrinkage across flow (SH across flow) | [%] | 1.3 |
| REact | | 3835 |
| Clarity (0.1 mm) | [%] | 61 | determined as described herein, preferably directed to an injection molded article, wherein the propylene homopolymer is not having the following properties:

| | | |
|---|---|---|
| Melt flow rate (MFR), determined at 230° C. and under a load of 2.16 kg according to ISO 1133 | [g/10 min] | 76 |
| melting temperature ($T_m$) | [° C.] | 161 |
| crystallization temperature ($T_c$) | [° C.] | 115 |
| glass transition temperature (Tg) | [° C.] | 2.0 |
| Xylene cold solubles (XCS) | [wt.-%] | 3.3 |
| mmmm pentad fraction (mmmm) | [%] | 93.2 |
| triad syndiotacticity rr (rr) | [%] | 2.0 |
| meso sequence length MSL2 | [—] | 76 |
| meso sequence length MSL4 | [—] | 92 | determined as described herein.

In yet another embodiment the present invention is furthermore directed to an injection molded article, wherein the propylene homopolymer is not having the following properties:

| | | |
|---|---|---|
| Melt flow rate (MFR), determined at 230° C. and under a load of 2.16 kg according to ISO 1133 | [g/10 min] | 76 |
| melting temperature (Tm) | [° C.] | 161 |
| crystallization temperature (Tc) | [° C.] | 115 |
| glass transition temperature (Tg) | [° C.] | 2.0 |
| Xylene cold solubles (XCS) | [wt.-%] | 3.3 |
| mmmm pentad fraction (mmmm) | [%] | 93.2 |
| triad syndiotacticity rr (rr) | [%] | 2.0 |
| meso sequence length MSL2 | [—] | 76 |
| meso sequence length MSL4 | [—] | 92 |
| Flexural Modulus | [MPa] | 1472 |
| Shrinkage in flow (SH in flow) | [%] | 1.1 |
| Shrinkage across flow (SH across flow) | [%] | 1.3 |
| REact | | 3835 |
| Clarity (0.1 mm) | [%] | 61 |
| Mw | [kg/mol] | 140 |
| MWD | | 6.2 | determined as described herein, preferably directed to an injection molded article, wherein the propylene homopolymer is not having the following properties:

| | | |
|---|---|---|
| Melt flow rate (MFR), determined at 230° C. and under a load of 2.16 kg according to ISO 1133 | [g/10 min] | 76 |
| melting temperature ($T_m$) | [° C.] | 161 |
| crystallization temperature ($T_c$) | [° C.] | 115 |
| glass transition temperature (Tg) | [° C.] | 2.0 |
| Xylene cold solubles (XCS) | [wt.-%] | 3.3 |
| mmmm pentad fraction (mmmm) | [%] | 93.2 |
| triad syndiotacticity rr (rr) | [%] | 2.0 |
| meso sequence length MSL2 | [—] | 76 |
| meso sequence length MSL4 | [—] | 92 |
| $M_w$ | [kg/mol] | 140 |
| MWD | | 6.2 | determined as described herein.

The above disclaimers are in particular disclosed with respect to claim 1 and the claims dependent thereon but not limited thereto.

The disclaimers present in the specification and claims are solely present for formal reasons and are not intended to make any statements regarding other aspects, particularly, but not limited to, novelty and inventive step.

Preferably the propylene homopolymer is obtained by polymerizing propylene in the presence of a Ziegler-Natta catalyst as defined in more detail below. The used catalyst is a non-phthalic catalyst, i.e. no phthalic compounds have been used or are formed during the preparation of the catalyst. Accordingly, the propylene homopolymer is a non-phthalic polymer. According to the present invention the term "phthalic compounds" refers to phthalic acid (CAS No. 88-99-3), its mono- and diesters with aliphatic, alicyclic and aromatic alcohols as well as phthalic anhydride or phthaloyl halides. Still more preferably the propylene homopolymer according to this invention is obtained by a process as defined in detail below by using the Ziegler-Natta catalyst as defined herein.

In the following the manufacture of the propylene homopolymer is described in more detail.

The propylene homopolymer according to this invention is preferably produced the presence of
(a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;
(b) optionally a co-catalyst (Co), and
(c) optionally an external donor (ED).

More preferably, the propylene homopolymer is produced in a sequential polymerization process comprising at least one reactor (R1) or at least two reactors (R1) and (R2), in the first reactor (R1) the total propylene homopolymer or the first propylene homopolymer fraction (H-PP1) of the total propylene homopolymer is produced. In the latter case subsequently the first propylene homopolymer fraction (H-PP1) is transferred into the second reactor (R2), in the second reactor (R2) the second propylene homopolymer fraction (H-PP2) is produced in the presence of the first propylene homopolymer fraction (H-PP1).

The term "sequential polymerization system" indicates that the propylene homopolymer is produced in at least one reactor or in at least two reactors connected in series. Accordingly, the present polymerization system comprises at least a first polymerization reactor (R1) and optionally a second polymerization reactor (R2) and third polymerization reactor (R3). The term "polymerization reactor" shall indicate that the main polymerization takes place. Thus in case the process consists of two polymerization reactors, this definition does not exclude the option that the overall system comprises for instance a pre-polymerization step in a pre-polymerization reactor. The term "consist of" is only a closing formulation in view of the main polymerization reactors.

The first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly, the average concentration of the first fraction ($1^{st}$ F) of the propylene homopolymer (i.e. the first propylene homopolymer fraction (H-PP1)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene homopolymer fraction (H-PP1) in the polymer slurry within the loop reactor (LR) is from 20 wt.-% to 55 wt.-% and more preferably from 25 wt.-% to 52 wt.-%, based on the total weight of the polymer slurry within the loop reactor (LR).

In case of at least two reactors, preferably at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Preferably the propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly, for the instant process at least one reactor, namely a slurry reactor (SR), and optionally one or two subsequent, namely a (first) gas phase reactor (GPR1) and optionally a second gas phase reactor (GPR2), connected in series are used. If needed prior to the slurry reactor (SR) a pre-polymerization reactor is placed.

The Ziegler-Natta catalyst (ZN-C) is fed into the first polymerization reactor (R1) and is transferred with the polymer (slurry) obtained in the first polymerization reactor (R1) into the subsequent reactors, if present. If the process covers also a pre-polymerization step it is preferred that all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

A preferred multistage process is a "loop-gas phase"-process, such as developed by *Borealis* (known as BORSTAR® technology) described e.g. in patent literature, such as in EP 0 887 379, WO 92/12182, WO 2004/111095, WO 98/58975, WO 98/58976, WO 98/58977, WO 99/25741, or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and optional in the third reactor (R3) is in the range of 75 to 95° C., more preferably in the range of 78 to 92° C.

Preferably the operating temperature in the second polymerization reactor (R2) is equal or higher to the operating temperature in the first polymerization reactor (R1). Accordingly it is preferred that the operating temperature (a) in the first polymerization reactor (R1) is in the range of 62 to 85° C., more preferably in the range of 65 to 85° C., still more preferably in the range of 67 to 82° C., like 70 to 80° C.;

and, optionally (b) in the second polymerization reactor (R2) is in the range of 75 to 95° C., more preferably in the range of 78 to 92° C., still more preferably in the range of 78 to 88° C.; with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range of from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range of from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time ($\tau$) in the first polymerization reactor (R1) is preferably at least 15 min, more preferably in the range of 15 to 80 min, still more preferably in the range of 20 to 60 min, like in the range of 24 to 50 min, and/or the average residence time ($\tau$) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time ($\tau$) in the third polymerization reactor (R3)—if present—is preferably at least 30 min, more preferably in the range of 30 to 120 min, still more preferably in the range of 40 to 100 min, like in the range of 50 to 90 min.

As mentioned above the instant process can comprises in addition to the (main) polymerization of the propylene homopolymer in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used propylene and the other ingredients such as the Ziegler-Natta catalyst (ZN-C) are directly introduced into the first polymerization reactor (R1).

Accordingly the process according the instant invention comprises the following steps under the conditions set out above (a) in the first polymerization reactor (R1), i.e. in a loop reactor (LR), propylene is polymerized obtaining the final propylene homopolymer (H-PP).

A pre-polymerization as described above can be accomplished prior to step (a).

Alternatively, the process according the instant invention comprises the following steps under the conditions set out above (a) in the first polymerization reactor (R1), i.e. in a loop reactor (LR), propylene is polymerized obtaining a first propylene homopolymer fraction (H-PP1) of the propylene homopolymer (H-PP), (b) transferring said first propylene homopolymer fraction (H-PP1) to a second polymerization reactor (R2), (c) in the second polymerization reactor (R2) propylene is polymerized in the presence of the first propylene homopolymer fraction (H-PP1) obtaining a second propylene homopolymer fraction (H-PP2) of the propylene homopolymer, said first propylene homopolymer fraction (H-PP1) and said second propylene homopolymer fraction (H-PP2) form the propylene homopolymer.

A pre-polymerization as described above can be accomplished prior to step (a).

The Ziegler-Natta Catalyst (ZN-C), the External Donor (ED) and the Co-Catalyst (Co)

As pointed out above in the specific process for the preparation of the propylene copolymer (R-PP) as defined above a Ziegler-Natta catalyst (ZN-C) must be used. Accordingly the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a phthalate or preferably a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or $MgCl_2$, but the catalyst is self-supported.

The Ziegler-Natta catalyst (ZN-C) can be further defined by the way as obtained. Accordingly, the Ziegler-Natta catalyst (ZN-C) is preferably obtained by a process comprising the steps of a)
- $a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or
- $a_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or
- $a_3$) providing a solution of a mixture of the Group 2 metal alkoxy compound (Ax) and a Group 2 metal alkoxy compound (Bx) being the reaction product of a Group 2 metal compound (MC) and the monohydric alcohol (B), optionally in an organic liquid reaction medium; or
- $a_4$) providing a solution of Group 2 metal alkoxy compound of formula $M(OR_1)_n(OR_2)_mX_{2-n-m}$ or mixture of Group 2 alkoxides $M(OR_1)_{n'}X_{2-n'}$ and $M(OR_2)_{m'}X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m+(2-n-m)=2$, provided that both n and m≠0, $0 < n' \leq 2$ and $0 < m' \leq 2$; and b) adding said solution from step a) to at least one compound (TC) of a transition metal of Group 4 to 6 and c) obtaining the solid catalyst component particles, and adding an internal electron donor (ID), preferably a non-phthalic internal donor (ID), at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion-solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx), especially the solution of $a_2$).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably C6 to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesium, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesium is used. Most preferred dialkyl magnesium are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesium, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane and or with $TiCl_4$. Washing solutions can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100 μm. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 2610270 and EP2610272 which are incorporated here by reference.

The Ziegler-Natta catalyst (ZN-C) is preferably used in association with an alkyl aluminum cocatalyst and optionally external donors.

As further component in the instant polymerisation process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ can be chosen independently from one another and can be the same or different and denote a hydrocarbon radical, in particular an alkyl or cycloalkyl group, and wherein p and q are numbers ranging from 0 to 3 with their sum p+q being equal to or less than 3. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Another group of preferred silanes are of general formula $$Si(OCH_2CH_3)_3(NR^3R^4)$$

wherein $R^3$ and $R^4$ can be the same or different a represent a linear, branched or cyclic hydrocarbyl group having 1 to 12 carbon atoms.

It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

The Ziegler-Natta catalyst (ZN-C) may be modified by prepolymerising it with a vinyl monomer of the formula $$CH_2=CH-CHR^1R^2$$

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

The polymerisation of the vinyl compound, e. g. VCH, can be done in any inert fluid that does not dissolve the polymer formed (e. g. polyVCH). It is important to make sure that the viscosity of the final catalyst/polymerised vinyl compound/inert fluid mixture is sufficiently high to prevent the catalyst particles from settling during storage and transport.

The adjustment of the viscosity of the mixture can be done either before or after the polymerisation of the vinyl compound. It is, e. g., possible to carry out the polymerisation in a low viscosity oil and after the polymerisation of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerised vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerisation of a vinyl compound should be sufficient to allow for complete reaction of the vinyl monomer, i. e. the polymerisation is continued until the amount of unreacted vinyl compounds in the reaction mixture (including the polymerisation medium and the reactants) is less than 0.5 wt-%, in particular less than 2000 ppm by weight (shown by analysis). Thus, when the prepolymerised catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerisation time of at least 30 minutes is required, preferably the polymerisation time is at least I hour and in particular at least 5 hours. Polymerisation times even in the range of 6 to 50 hours can be used. The modification can be done at temperatures of 10 to 70° C., preferably 35 to 65° C.

According to the invention, nucleated high-stiffness propylene polymers are obtained when the modification of the catalyst is carried out in the presence of strongly coordinating external donors.

General conditions for the modification of the catalyst are also disclosed in WO 00/6831, incorporated herein by reference with respect to the modification of the polymerisation catalyst.

The preferred embodiments as described previously in the present application with respect to the vinyl compound also apply with respect to the polymerisation catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantification of Microstructure by NMR Spectroscopy

Quantitative nuclear-magnetic resonance (NMR) spectroscopy was used to quantify the isotacticity, tacticity distribution and content of regio-defects of the polymers.

Quantitative $^{13}C$ $\{^1H\}$ NMR spectra recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm selective excitation probehead at 125° C. using nitrogen gas for all pneumatics. Approximately 200 mg of material was dissolved in 1,2-tetrachloroethane-$d_2$ (TCE-$d_2$). This setup was chosen primarily for the high resolution needed for tacticity distribution quantification (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251). Standard single-pulse excitation was employed utilising the NOE and bi-level WALTZ16 decoupling scheme {zhou07,busico07}. A total of 8192 (8 k) transients were acquired per spectra The tacticity distribution was quantified through integration of the methyl region between 23.6 and 19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251). Characteristic signals corresponding to the presence of regio defects (Resconi, L., Cavallo, L., Fait, A., Piemontesi, F., Chem. Rev. 2000, 100, 1253) and ethylene copolymerisation (Wang, W.-J., Zhu, S., Macromolecules 33 (2000), 1157; Cheng, H. N., Macromolecules 17 (1984), 1950) were not observed.

The pentad tacticity distribution was determined through direct separate integration of each methyl signal from a given steric pentad followed by normalisation to the sum of methyl signals from all steric pentads. The relative content of a specific steric pentad was reported as the mole fraction or percentage of a given steric pentad xxxx with respect to all steric pentads:

[xxxx]=xxxx/(mmmm+mmmr+rmmr+mmrr+xmrx+ mrmr+rrrr+mrrr+mrrm)

where xmrx represents the combined integral of both mmrm and rmrr as signal from these steric pentads are not commonly resolved. The pentad isotacticity was thus given by:

[mmmm]=mmmm/(mmmm+mmmr+rmmr+mmrr+ xmrx+mrmr+rrrr+mrrr+mrrm)

The triad tacticity distribution was indirectly determined from the pentad tacticity distribution using the known pentad-triad necessary relationships:

[mm]=[mmmm]+[mmmr]+[rmmr]

[mr]=[mmrr]+[xmrx]+[mrmr]

[rr]=[rrrr]+[mrrr]+[mrrm]

The average length of stereo sequences consisting of two or more monomer unites with like tacticity, i.e. the meso sequence length determined from the triad tacticity distribution (MSL2), was calc using the relative amounts of the mm and mr steric triads:

MSL2=2+2[mm]/[mr]

The average length of stereo sequences consisting of four or more monomer unites with like tacticity, i.e. the meso sequence length determined from the pentad tacticity distribution (MSL4), was calc using the relative amounts of the mmmm and mmmr steric pentads:

MSL4=4+2[mmmm]/[mmmr]

Klimke, K., Parkinson, M., Piel, C., Kaminsky, W., Spiess, H. W., Wilhelm, M., Macromol. Chem. Phys. 2006; 207:382.
Parkinson, M., Klimke, K., Spiess, H. W., Wilhelm, M., Macromol. Chem. Phys. 2007; 208:2128.
Pollard, M., Klimke, K., Graf, R., Spiess, H. W., Wilhelm, M., Sperber, O., Piel, C., Kaminsky, W., Macromolecules 2004; 37:813.
Filip, X., Tripon, C., Filip, C., J. Mag. Resn. 2005, 176, 239
Griffin, J. M., Tripon, C., Samoson, A., Filip, C., and Brown, S. P., Mag. Res. in Chem. 2007 45, S1, S198
Castignolles, P., Graf, R., Parkinson, M., Wilhelm, M., Gaborieau, M., Polymer 50 (2009) 2373
Busico, V., Cipullo, R., Prog. Polym. Sci. 26 (2001) 443
Busico, V., Cipullo, R., Monaco, G., Vacatello, M., Segre, A. L., Macromoleucles 30 (1997) 6251
Zhou, Z., Kuemmerle, R., Qiu, X., Redwine, D., Cong, R., Taha, A., Baugh, D. Winniford, B., J. Mag. Reson. 187 (2007) 225
Busico, V., Carbonniere, P., Cipullo, R., Pellecchia, R., Severn, J., Talarico, G., Macromol. Rapid Commun. 2007, 28, 1128
Resconi, L., Cavallo, L., Fait, A., Piemontesi, F., Chem. Rev. 2000, 100, 1253

$MFR_2$ (230° C./2.16 kg) is measured according to ISO 1133 (230° C., 2.16 kg load)

The Xylene Soluble Fraction at Room Temperature (XCS, Wt.-%):

The amount of the polymer soluble in xylene is determined at 25° C. according to ISO 16152; first edition; 2005 Jul. 1.

DSC analysis, melting temperature ($T_m$) and melting enthalpy ($H_m$), crystallization temperature ($T_c$) and crystallization enthalpy ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and crystallization enthalpy ($H_c$) are determined from the cooling step, while melting temperature and melting enthalpy ($H_m$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Clarity was determined on injection molded plaques of 60×60×1 mm$^3$ according to ASTM D 1003/92.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Flexural Modulus was determined in 3-point-bending at 23° C. according to ISO 178 on 80×10×4 mm$^3$ test bars injection moulded in line with EN ISO 1873-2.

Shrinkage: SH in Flow and SH Across Flow

The shrinkage was measured on injection molded rectangular plates of 150×80×2 mm$^3$ filled with a triangular distributor and a 0.5 mm thick film gate along the shorter side. A melt temperature of 260° C., a mold temperature of 60° C. and an injection speed at the gate of 100 mm/s were used for producing the specimens which were cut free from the distributor immediately after demolding. The specimens were then stored at +23° C. for 96 hours and the relative shrinkage against the mold dimension was determined in both longitudinal (SH in flow) and transversal direction (SH across flow), measuring in the center of the specimen in each case. For determining average values 10 specimens were tested, and the difference was calculated from the averages.

REact Parameter:

The materials were pressed into films and circular samples were punched out of the films with weight of ca. 2 mg. DSC runs were performed with heating rate of 20° C./min to the temperature of 210° C. which was kept constant for 10 minutes. The samples were then cooled with different cooling rates (3, 10, 30, 100° C./min) and the crystallization temperature at each cooling rate was recorded. The quenching resistance was evaluated with a phenomenological dimensionless parameter "REact" often related to activation energy, Eact for various phenomena. This approach was first described by H. E. Kissinger in Journal of Research of the National Bureau of Standards 1956, volume 57, issue 4, page 217, equation 7, for the differential thermal analysis of kaolinite clays, and afterwards used also for polymer crystallization.

$$REact = -R^{-1} E_{act} = d\left[\ln\left(\frac{T'}{T_{cr}^2}\right)\right] \Big/ \left(\frac{1}{T_{cr}}\right)$$

where "T'" is the cooling rate from the melt, "Tcr" is the crystallization temperature, and "R" is the gas constant.

Number average molecular weight (Mn), weight average molecular weight (Mw) and polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscometer was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

B. Examples

Used Chemicals:
2-ethyl-hexanol—CAS no 104-76-7
propylene glycol butyl mono ether—CAS no 5131-66-8, provided by Sigma-Aldrich
bis(2-ethylhexyl) citraconate—CAS no 1354569-12-2
Necadd 447—provided by M-I SWACO
Viscoplex 1-254—provided by RohMax Additives GmbH
diethyl aluminum chloride—CAS no 96-10-6, provided by Witco Catalyst for the Inventive Example (IE1):

The catalyst used in the polymerization process for the propylene homopolymer of the inventive example (IE1) was prepared as follows:

Catalyst Preparation 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C.

Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20 to 30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml toluene.

Wash 4: Washing was made with 60 ml of heptane.

Wash 5. Washing was made with 60 ml of heptane under 10 minutes stirring.

Afterwards stirring was stopped and the reaction mixture was allowed to settle for 10 minutes decreasing the temperature to 70° C. with subsequent siphoning, and followed by N2 sparging for 20 minutes to yield an air sensitive powder.

The thus obtained catalyst was used along with triethyl-aluminium (TEAL) as co-catalyst and cyclohexylmethyl dimethoxy silane (C-Donor) as donor.

The aluminium to donor ratio, the aluminium to titanium ratio and the polymerization conditions are indicated in table 1.

Catalyst for the Comparative Example (CE1):

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390.

Triethylaluminium (TEAL), dicyclopentyldimethoxysilane (D-donor) as donor catalyst as produced above and vinylcyclohexane (VCH) were added into oil, e.g. Technol 68, provided in amounts so that Al/Ti was 3-4 mol/mol, Al/D was as well 3-4 mol/mol, and weight ratio of VCH/solid catalyst was 1/1. The mixture was heated to 60-65° C. and allowed to react until the content of the unreacted vinylcyclohexane in the reaction mixture was less than 1000 ppm. Catalyst concentration in the final oil-catalyst slurry was 10-20 wt-%.

The respective process is described in EP 1 028 984 and EP 1 183 307.

The thus obtained catalyst was used along with triethyl-aluminium (TEAL) as co-catalyst and dicyclo pentyl dimethoxy silane (D-donor) as donor.

The aluminium to donor ratio, the aluminium to titanium ratio and the polymerization conditions are indicated in table 1.

TABLE 1

Preparation of the Examples

|  |  | CE1 | IE1 |
|---|---|---|---|
| Donor | type | D | C |
| TEAL/Ti | [mol/mol] | 657 | 150 |
| TEAL/Donor | [mol/mol] | 13.4 | 18.8 |
| Prepolymerization |  |  |  |
| Time | [h] | 0.2 | 0.35 |
| Temperature | [° C.] | 30 | 30 |
| Loop (H-PP1) |  |  |  |
| Time | [h] | 0.6 | 0.7 |
| Temperature | [° C.] | 80 | 75 |
| MFR$_2$ | [g/10 min] | 142 | 76.0 |
| XCS | [wt.-%] | 1.6 | 3.3 |
| H$_2$/C3 ratio | [mol/kmol] | 8.0 | 7.1 |
| Amount | [wt.-%] | 55 | 100 |
| 1 GPR (H-PP2) |  |  |  |
| Time | [h] | 0.8 | — |
| Temperature | [° C.] | 80 | — |
| H$_2$/C3 ratio | [mol/kmol] | 14.5 | — |
| Amount | [wt.-%] | 45 | 0 |
| Final |  |  |  |
| MFR$_2$ | [g/10 min] | 145 | 76 |
| XCS | [wt.-%] | 1.8 | 3.3 |
| Tm | [° C.] | 166 | 160 |
| Tc | [° C.] | 129 | 115 |

TABLE 2

Properties of the Examples

| Example |  | CE1 | CE2 | IE1 |
|---|---|---|---|---|
| MFR | [g/10 min] | 145 | 75 | 76 |
| Tm | [° C.] | 166 | 161 | 161 |
| Tc | [° C.] | 129 | 116 | 115 |
| Tg | [° C.] | 3.5 | 1.5 | 2.0 |
| XCS | [wt.-%] | 1.8 | 4.0 | 3.3 |
| 2, 1 | [mol.-%] | n.d | n.d. | n.d. |
| mmmm | [%] | 97.4 | 92.4 | 93.2 |
| rr | [%] | 0.6 | 2.3 | 2.0 |
| MSL2 | [—] | 229 | 63 | 76 |
| MSL4 | [—] | 174 | 92 | 92 |
| Flexural Modulus | [MPa] | 2250 | 1318 | 1472 |
| SH in flow | [%] | 1.2 | 1.2 | 1.1 |
| SH across flow | [%] | 1.6 | 1.3 | 1.3 |
| REact |  | 6951 | 3396 | 3835 |
| Clarity (0.1 mm) | [%] | 48 | 53 | 61 |
| M$_w$ | [kg/mol] | 78 | 145 | 140 |
| MWD |  | 5.2 | 4.8 | 6.2 | n.d. not detectable

CE2 is the commercial grade "Purell HP570U" of Basell Sales & Marketing Company B.V., The Netherlands.

The invention claimed is:

1. A process for producing an injection molded article comprising a propylene homopolymer, the process comprising:
polymerizing propylene to obtain the propylene homopolymer, wherein the propylene is polymerized in the presence of:
(a) a Ziegler-Natta catalyst (ZN-C) comprising compounds (TC) of a transition metal of Group 4 to Group 6 of IUPAC, a Group 2 meal compound (MC), and an internal donor (ID), wherein said internal donor (ID) is a non-phthalic compound;
(b) a co-catalyst (Co); and
(c) an external donor (ED);
wherein the ratio of co-catalyst (Co) to external donor (ED) [Co/ED] is 5 to 45; and
wherein the propylene homopolymer has:
(a) a melt flow rate MFR$_2$ (230° C./2.16 kg) measured according to ISO 1133 in the range of 40 to 120 g/10 min;
(b) a pentad isotacticity (mmmm) of more than 92.5% determined by $^{13}$C-NMR;
(c) a meso sequence length (MSL4) of equal or more than 90.0; MSL4 is calculated by formula (1)

$$MSL4 = \frac{2*[mmmm]}{[mmmr]} + 4 \quad (1)$$

wherein
"[mmmm]" is % of mmmm pentads
"[mmmr]" is % of mmmr pentads,
determined by $^{13}$C-NMR spectroscopy; and
(d) a molecular weight distribution (MWD) of 7.5 or less; and injection molding the propylene homopolymer.

2. The process according to claim 1, wherein the propylene homopolymer has a meso sequence length (MSL2) of equal or more than 65.0; MSL2 is calculated by formula (2):

$$MSL2 = \frac{2*[mm]}{[mr]} + 2 \quad (2)$$

wherein
"mm" are % of mm triads,
"[mr]" are % of mr triads,
determined by $^{13}$C-NMR spectroscopy.

3. The process according to claim 1, wherein the propylene homopolymer has:
(a) a triad syndiotacticity (rr) of not more than 2.5% as determined by $^{13}$C-NMR spectroscopy; and/or
(b) a pentad isotacticity (mmmm) of more than 92.5 to 97.3% as determined by $^{13}$C-NMR spectroscopy.

4. The process according to claim 1, wherein the propylene homopolymer has 2,1 erythro regio-defects of equal or below 0.4 mol. % determined by $^{13}$C-NMR spectroscopy determined by $^{13}$C-NMR spectroscopy.

5. The process according to claim 1, wherein the propylene homopolymer has a xylene cold soluble content (XCS) determined according ISO 16152 (25° C.) of below 4.0 wt. %.

6. The process according to claim 1, wherein the propylene homopolymer has a melting temperature of at least 158° C.

7. The process according to claim 1, wherein the propylene homopolymer has a crystallization temperature of equal or below 122° C.

8. The process according to claim 1, wherein the propylene homopolymer is not-visbroken.

9. The process according to claim 1, wherein the propylene homopolymer has a flexural modulus measured at 23° C. according to ISO 178 of at least 1,350 MPa.

10. The process according to claim 1, wherein the propylene homopolymer has a clarity measured according to ASTM D 1003/92 on injection molded specimen of 1 mm thickness of at least 55%.

11. The process according to claim 1, wherein the injection molded article is for healthcare applications.

12. The process according to claim 1, wherein the injection molded article is selected from the group consisting of syringes, pipette tips, and PCR equipment.

13. The process according to claim 1, wherein the injection molded article has in its largest dimension a length of not more than 150 mm.

14. The process according to claim 1, wherein the injection molded article comprises at least 75 wt. %, based on the total weight of the injection molded article, of the propylene homopolymer.

15. The process according to claim 1, wherein the propylene homopolymer is does not have the following properties:

melt flow rate (MFR), determined at 230° C. and under a load of 2.16 kg according to ISO 1133, 76 g/10 min;
melting temperature (Tm), 161° C.;
crystallization temperature (Tc), 115° C.;
glass transition temperature (Tg), 2.0° C.;
Xylene cold solubles (XCS), 3.3 wt. %;
mmmm pentad fraction (mmmm), 93.2%;
triad syndiotacticity rr (rr), 2.0%;
meso sequence length MSL2, 76;
meso sequence length MSL4, 92;
Flexural Modulus, 1472 MPa;
Shrinkage in flow (SH in flow), 1.1%;
Shrinkage across flow (SH across flow), 1.3%;
React, 3835; and
Clarity (0.1 mm), 61%.

16. The process according to claim 1,
wherein said internal donor (ID) is a non-phthalic acid ester.

17. The process according to claim 16, wherein:
the internal donor (ID) is selected from optionally substituted malonates, maleates, succinates, glutarates, cyclohexene-1,2-dicarboxylates, benzoates and derivatives and/or mixtures thereof.

* * * * *